United States Patent

Schmidt

[15] 3,673,133

[45] June 27, 1972

[54] SYNTHETIC LATEX FOAM RUBBER AND METHOD OF MAKING SAME

[72] Inventor: Ernst Schmidt, Akron, Ohio

[73] Assignee: The Firestone Tire & Rubber Company, Akron, Ohio

[22] Filed: Dec. 18, 1961

[21] Appl. No.: 160,343

Related U.S. Application Data

[63] Continuation-in-part of Ser. No. 744,677, June 26, 1958, abandoned.

[52] U.S. Cl. ................260/2.5 L, 260/29.7 S, 260/29.7 D, 260/29.7 UA, 260/41.5 R, 260/41.5 A, 260/887, 260/890, 260/DIG. 22

[51] Int. Cl. .........................................................C08j 1/16

[58] Field of Search....................260/2.5 L, 29.7 UA, 29.7 S, 260/29.7 D

[56] References Cited

UNITED STATES PATENTS

| | | | |
|---|---|---|---|
| 2,457,684 | 12/1948 | Klemp | 260/2.5 L |
| 2,706,183 | 4/1955 | Carter | 260/2.5 L |
| 3,015,642 | 1/1962 | Bawn et al. | 260/2.5 L |
| 3,031,427 | 4/1962 | Talalay | 260/2.5 L |
| 3,228,905 | 1/1966 | Talalay et al. | 260/2.5 L |
| 3,238,172 | 3/1966 | Talalay et al. | 260/2.5 L |

FOREIGN PATENTS OR APPLICATIONS

| | | | |
|---|---|---|---|
| 537,910 | 3/1957 | Canada | 260/2.5 L |
| 754,553 | 8/1956 | Great Britain | 260/2.5 L |

Primary Examiner—Paul Lieberman
Assistant Examiner—Morton Foelak
Attorney—S. M. Clark and H. N. Harger

[57] ABSTRACT

This invention relates to an internally reinforced synthetic butadiene rubber latex containing a rubber reinforcing substance.

36 Claims, No Drawings

SYNTHETIC LATEX FOAM RUBBER AND METHOD OF MAKING SAME

This application is a continuation-in-part of my application Ser. No. 744,677, filed June 26, 1958, and now abandoned.

This invention relates to improved synthetic latex foam rubber, method of producing same and to improved reinforced synthetic rubber latices useful in the manufacture of latex foam articles.

By "foam rubber" herein is meant cellular rubber produced by introducing air or other gas into a rubber latex to provide a froth or foam, gelling the froth or foam and vulcanizing the resulting gelled froth or foam. The introduction of gas into the latex is conventionally effected either by whipping or beating air into the latex by mechanical means or by incorporating one or more compounds into the latex capable of evolving or generating a gas which froths the latex. Gelling or coagulation of the latex foam is conventionally brought about in the case of mechanically frothed latex by admixing a gelling agent with the latex foam; there is normally employed a delayed-action gelling agent, such as an alkali metal fluosilicate, fluotitanate or fluozirconate, an ammonium salt of a strong acid, or other acidic substance such as carbon dioxide; such foam has also been gelled by freezing, or by freezing in conjunction with one of the chemical gelling agents just mentioned. Latex foam produced by chemical foaming (e.g. the action of a catalyst such as yeast upon hydrogen peroxide) has been gelled by freezing and/or by the action of an acidic coagulating gas such as carbon dioxide, or alternatively by the action of a delayed-action gelling agent.

Foam rubber has for many years been most desirably produced from natural rubber latex. Such foam rubbers are characterized by high strength both in the hot wet state and in the dry state, high resilience, and high load bearing capacity in relation to density. Attempts to substitute in all or in part one or more synthetic latices for natural rubber latex has heretofore resulted in a sacrifice of considerable of the more desirable properties normally characterizing natural rubber latex foam. This failure of synthetic rubber foam to equal natural latex foam has been particularly serious with regard to strength of the foam, both in the hot wet state as well as in the final dry state.

Thus the foam rubber industry has for many years been attempting to develop from synthetic latices a foam rubber product comparable in physical and chemical properties to the conventional natural latex foam, but none of these attempts has been successful. Moreover, the higher cost in recent years of natural latex in comparison with conventional butadiene-styrene and polybutadiene synthetic rubber latices has caused considerable research effort to be directed towards solving this problem. The synthetic polymers utilized in these researches have varied widely all the way from the butadiene-styrene copolymers of about 50:50 proportion of the respective monomers through the more usual synthetic rubbery copolymers of about 75 percent butadiene and about 25 percent styrene to polybutadiene itself. Both hot and cold polymerized polymer latices of these types have been tried. Latices of these types having many different solids contents have been tried. Various synthetic rubber latices have been tried alone, blended with each other and/or blended with natural latex. While some of these attempts have improved the properties of synthetic rubber foam to a degree, none of the foam products has been entirely satisfactory or has approached natural latex foam in physical properties.

An object of the invention, therefore, is to provide a novel foam rubber of exceptional properties comprising essentially a synthetic rubber. Another object is to provide a method of producing from synthetic polymer latices a foam rubber having properties approximating or surpassing the properties of foam rubber from natural rubber latex. Another object is to provide reinforced synthetic rubber latices useful in the production of foam articles, and also to provide suitable methods of making these latices. Other objects will become apparent in the following description of the invention.

The objects of the invention are realized by the production and utilization of improved reinforced synthetic rubber latices of unique properties. The improved latices are based upon a synthetic butadiene rubber, and they are eminently suited for the production of latex foam articles displaying chemical and physical properties substantially equal to or superior to the well known properties of conventional natural latex foam rubber.

The synthetic butadiene rubbers utilized in the invention comprise the many and varied butadiene-styrene synthetic rubbers containing 50 per cent or more of bound butadiene-1,3 (SBR), the various polybutadienes (BR), the polyisoprenes (IR), and the other known suitable synthetic butadiene rubbers. Examples of other synthetic butadiene rubbers include chloroprene rubbers (CR), acrylate-butadiene rubbers (ABR), isobutylene-isoprene rubbers (IIR), nitrile-butadiene rubbers (NBR), nitrile-chloroprene rubbers (NCR), pyridine-butadiene rubbers (PBR), styrene-chloroprene rubbers (SCR) and styrene-isoprene rubbers (SIR). The parenthetical abbreviations are in accordance with the ASTM Designation: D1418–56T. The synthetic butadiene rubber can be employed in the invention in the form of the usual polymerized latex or as a stable aqueous dispersion of the solid rubber, such dispersion being considered a latex herein. By "latex" is meant a stable, fluid aqueous colloidal dispersion or emulsion essentially of a rubber or resin, the particle sizes of which vary from about 10,000 A to about 300 A. A "high solids latex" is used to mean a latex having about 50 percent to about 80 percent by weight of total solids and generally from about 55 percent to about 70 percent by weight of rubber or reinforced rubber particles.

The important feature of the invention is the reinforcement of a synthetic rubber latex by means of a suitable rubber reinforcing substance. Usually a rigid, particulate organic resin is employed in the form of a fluid aqueous colloidal dispersion thereof. The dispersion is constituted so as to be compatible with the synthetic rubber latex to be reinforced. The reinforcement is obtained by mixing a portion of the dispersion of the reinforcing substance with a portion of the rubber latex. The reinforcing dispersion is compatible with the latex in mixing readily therewith without gelation or coagulation, and the dispersion is further characterized as compatible in that the reinforcing substance will not agglomerate separately from the rubber of the latex upon coagulation or gelation of the mixture; the dispersion should furthermore be designed to gel at approximately the pH of gelation of the rubber latex. The disperse phase of the reinforcing dispersion in its most preferred form consists essentially of a finely divided organic resin or resin-like substance such as polystyrene, styrene copolymers with one or more unsaturated monomers with the styrene predominating, chlorinated styrene polymers, styrene-acrylonitrile copolymers, polyvinyl chloride, vinyl chloride copolymers, vinylidene chloride polymers and copolymers, cross-linked styrene polymers, polymethylmethacrylate and similar hard acrylate resins, cross-linked styrene-butadiene polymers, hard vulcanized SBR and polybutadiene, styrene-butadiene-divinylbenzene-methacrylic acid quaternary polymers neutralized by an amine or other suitable alkaline substance, and other known hard or rigid organic polymers or resins, either natural or synthetic. Other reinforcing substances such as fine carbon black, rubber reinforcing silica, water insoluble metal silicates and very fine calcium carbonate may on occasion be used but their use presents special problems and their effect is not as pronounced as that of the preferred reinforcing substances.

As a general proposition, strength reinforcement obtained in accordance with the invention is dependent on the average particle size of the synthetic rubber latex being reinforced — the smaller the average particle size of the disperse phase of the rubber latex, the greater the reinforcement. The synthetic butadiene rubber latices reinforced in accordance with the invention have average particle sizes in the range of 200 to 1,500 A. More typically the average particle size is in the range of 300 to 1,000 A, best processing being realized if the average particle size is from about 600 to about 800 A.

Similarly, the smaller the particle size of the reinforcing dispersion, the greater the strength reinforcement obtained in accordance with the invention. The particle size of the disperse phase of the reinforcing dispersion should be no more than about 2,000 A and, preferably for high reinforcement should be less than 1,000 A such as an average of 100 A to 800 A. On the dry basis, the rubber of the reinforced latex of the invention predominates over the reinforcing substance, the latter being present to the extent of about 1 part to about 30 parts per hundred parts of the rubber (phr) for maximum reinforcement. Larger proportions of the reinforcing substance or pigment tend to lower the strength of a rubber film or foam produced from the reinforced latex.

In practice of the invention a synthetic butadiene rubber latex as described above is mixed with a reinforcing dispersion as described above and the average particle size of the disperse phase of the resulting latex mixture is increased by an agglomerating treatment. By the agglomerating treatment the disperse phase of the latex mixture is transformed from being composed of discrete relatively small particles of synthetic rubber and discrete relatively small particles of reinforcing substance to being composed predominently of relatively larger spherical, composite particles containing both synthetic rubber and reinforcing substance. The reinforcing substance is no longer separable from the synthetic rubber either through normal processing of the agglomerated latex or through other physical treatment thereof.

The average particle size of the reinforced latex is preferably sufficiently large to allow of a high solids content while retaining suitable fluidity or viscosity. Thus the average particle size should be in the range of about 600 A to about 10,000 A, suitably in the range of about 1,000 A to about 5,000 A and more suitably at least 1,500 A. Although the reinforced latex may be utilized without concentration, it is usually preferred to concentrate the reinforced latex by removing water therefrom as by evaporation, filtration, electrodecantation, or by chemical and/or mechanical agglomeration and/or concentration. For instance, a relatively dilute latex can be centrifuged or creamed to produce a concentrate and a skim (separated mechanically and usually discarded or separately utilized). If the average particle size of the reinforced latex is in the order of that of natural latex, the reinforced synthetic latex can be centrifuged or can be creamed to a high solids latex by addition of a colloidal creaming agent.

Various known methods of agglomerating can be employed. An efficient method involves freezing the rubber latex after admixture with the reinforcing dispersion. Other agglomerating techniques include chilling the latex or mixture (the "-stockpunkt" method) and/or adding an electrolyte, such as ammonium carbonate, sodium chloride or other destabilizing agent. Thus particle growth or agglomeration can be obtained by increasing the ionic strength of the latex, or by lowering the pH, or by a combination of any of these techniques. Addition of a small concentration of a gelling or coagulating agent accomplishes agglomeration, whereas larger concentrations of a monovalent cation neutral salt are required for equivalent particle growth. In this discussion gelling agents are considered to include acidic substances and salts of polyvalent metal ions.

Although some reinforcement is realized upon mixing the reinforcing dispersion with a latex of a high Mooney synthetic rubber, maximum strength reinforcement is obtained with softer rubbers, having Mooney ML-4 values below 100. However, if other considerations permit some sacrifice of strength, latices of synthetic rubbers of higher Mooney are suitable employed in practice of the invention, e.g., those having Mooney values as high as 120 and even as high as 150. Throughout the present specification, it is to be understood that all plasticity figures are in terms of Mooney ML-4, which or of often referred to, for brevity, simply as "Mooney" values. In general, it is preferred to employ a latex of a butadiene rubber having a Mooney ML-4 value in the range of about 40 to about 70. There is indication that the character of the emulsifying agent present in the latex and/or in the reinforcing dispersion has an appreciable effect upon the strength of a film or foam produced from the reinforced latex. Excellent results are obtained through the use of rosin soaps (typical of the standard GR-S 1500 formula) or mixed soaps (typical of GR-S 1502 and GR-S 2105 formulas). Reinforcement is obtained, however, in the presence of standard soaps and other known emulsifying agents.

A reinforced latex of the invention can be compounded with antioxidant, antiozonant, sulfur or other vulcanizing agent, accelerator and/or activator, zinc oxide or other activating ingredient, other reinforcing or non-reinforcing pigment or filler by techniques known to the latex art. The novel latex, before or after such compounding, can be admixed or blended with a compatible latex or aqueous dispersion of another rubber, and especially with another known type of synthetic butadiene rubber latex. For example, a concentrated agglomerated reinforced latex based upon a GR-S 1500 type latex can be improved in respect to certain foam processing operations by blending with a GR-S 2105 type of latex, before or after compounding with usual vulcanizing ingredients and pigments. Foam articles from the blended latex also possess lower permanent set.

An important feature of the invention is the incorporation of a pigment or filler into the reinforced synthetic rubber latex prior to its utilization in the production of foam or other rubber product. Although any of the know latex fillers and pigments can be incorporated into the latex at this point, it is often preferred to use a relatively coarse pigment or filler in order to retain maximum resilience in foam articles produced from the latex. Thus, a mechanically ground limestone gives excellent and superior results with certain reinforced latices of the invention in comparison with fine precipitated calcium carbonate. The filler is suitably dispersed in water by wellknown latex compounding techniques and then admixed with the latex prior to utilization of the latter in foam manufacture. Examples of other suitable fillers or pigments include silicates, such as talc, other forms of calcium carbonate, barytes, clay (especially the "soft" clays), rigid organic resinous fillers such as polystyrene, hard vulcanized natural or synthetic rubber latices, silica (especially ground sand), and the like. So far as foam production is concerned, the relatively coarse fillers can be utilized to a larger extent than can the finer pigments. For example, ground limestone or sand can be employed to the extent of 50 to 150 parts per 100 parts of reinforced synthetic latex solids, whereas similar high loadings in conventional synthetic rubber latices would result in rubber products too weak to be of commercial value. An added advantage of coarse calcium carbonate in latex for foam is the discovery that reinforced synthetic rubber latex containing such coarse filler processes better in the production of foam rubber articles than does similar latex containing some other pigment. It has also been found that addition of coarse calcium carbonate to certain of the reinforced synthetic rubber latices gave rise to foam articles having lower permanent set.

The invention is further illustrated by the following specific examples:

EXAMPLE 1

A resin latex was produced by polymerizing the following ingredients:

| | Parts by Weight |
|---|---|
| Styrene | 60.00 |
| Divinyl benzene | 20.00 |
| Butadiene | 20.00 |
| Potassium persulfate | 0.60 |
| Potassium oleate (as a 20% solution) | 4.50 |
| Potassium rosin soap (as a 20% solution) | 5.50 |
| A tertiary alkyl | |

| | |
|---|---|
| mercaptan modifier | 0.036 |
| Water | 270.00 |

The polymerization was carried to complete conversion at a temperature of 158° F. The resulting terpolymer resin latex had a solids content of 28.6 percent and an average particle diameter of about 400 A.

An amount of the resin latex containing 10 parts by weight resin was mixed with 1 part fatty acid soap and an amount of a conventional GR-S 1500 latex (having a solids content of 26.4 percent, an average particle diameter of about 600 A and a Mooney ML-4 viscosity of 52) containing 100 parts by weight of the GR-S rubber. The specification for producing GR-S 1500 is as follows:

Specification for GR-S 1500

| Ingredient | Parts/100 parts monomers |
|---|---|
| Charge formula | |
| Butadiene (100% basis) | 72 |
| Styrene (100% basis) | 28 |
| Water | 180–200 |
| Potassium rosin soap or equivalent | 4.5 |
| Trisodium phosphate dodecahydrate or equivalent | 0.8 max. |
| Tamol N* or equivalent | 0.15 max. |
| Versene Fe-3 or equivalent | 0.02 max. |
| Ferrous sulfate heptahydrate | 0.3 max. |
| Potassium pyrophosphate | 0.45 max. |
| Paramenthane hydroperoxide or equivalent | 0.15 max. |
| Tertiary alkyl mercaptan modifier | as required |
| Shortstop | |
| Sodium dimethyl dithiocarbamate or equivalent | 0.15 max. |
| Polyamine H or equivalent | 0.1 max. |
| Reaction details | |
| Reaction temperature | 40–43° F. |
| Conversion | 60% |
| Mooney viscosity (ML-4 at 212° F.) | 52 |

*A salt of the condensation product of naphthalene sulfonic acid with formaldehyde.

The latex mixture was then frozen at a temperature of 14° F. to increase the average particle size of the disperse phase to in excess of 1,000 A. The frozen latex was allowed to thaw and then concentrated by evaporation to a total solids content of 64 percent.

Foam rubber was produced from the agglomerated and concentrated latex mixture according to the following procedure. A foamable latex compound was prepared according to the following recipe:

| | Parts by Weight as dry solids |
|---|---|
| Coagglomerated concentrated latex | 112.0 |
| Sulfur | 2.0 |
| Zinc diethyl dithiocarbamate | 1.0 |
| Zinc mercaptobenzothiazole | 1.0 |
| Trimene base | 1.5 |
| Antioxidant | 1.0 |

The above latex compound was whipped to a desired foam density and the following dispersion was introduced with stirring into the foam:

| | Parts by Weight as dry solids |
|---|---|
| Diphenyl guanidine (as 25% dispersion) | 0.5 |
| Zinc oxide (as 40% dispersion) | 3.0 |
| Sodium silicofluoride (as 50% dispersion) | 4.0 |

The foam mixture was then introduced into suitable molds previously heated to about 110° F., allowed to gel and vulcanized in the presence of steam at 212° F.

Properties of Hot Wet Tensile, Dry Tear Strength, Compression Modulus, Resilience and Compression Set were determined on samples of the resulting foam. These properties in this instance, as well as in the succeeding examples, were determined as now described.

For the Hot Wet Tensile test a cylindrical mold is employed containing a solid central core of a diameter of 1½ inches and having internal dimensions of a height of 2 inches and a diameter of 3½ inches such as to produce a foam rubber sample in the form of a hollow cylinder 2 inches high with an overall diameter of 3½ inches and a wall thickness of 1 inch. The mold is filled with liquid foam and covered; the foam is allowed to gel and then cured in a steam oven. When the sample is cured it is removed from the mold and immediately while still hot placed in a tension machine and subjected to tension at a rate of one-half inch per second until the sample breaks, the load in pounds at the time of break being noted. Since the cross sectional area of the foam rubber subjected to the best is 4 in.$^2$, the tension at break is reported as pound/4 in.$^2$ In order to equate the observed values to values for foam rubber of a given density correction of the observed value is made to a density of 0.085 gm./c.c. as follows. The broken sample is dried and weighed. The mold volume being 257 c.c., the weight required to produce a density of 0.085 g.m./c.c. is 21.85 grams. Consequently, the hereafter reported Hot Wet Tensile values are calculated by multiplying the observed tensile in pounds by 21.85 grams and dividing by the dry weight of the sample in grams.

The Tear Strength in pounds per linear inch is obtained by dieing out a sample of foam rubber from a dry slab of foam rubber one inch thick by the use of a rectangular cutting die which will provide a foam rubber having a length of 4 inches, a width of 2½ inches and a one inch long initial cut on the short side. Friction tape is wrapped around each of the two legs of the foam rubber sample to provide tabs which can be held in the jaws of a Scott Tensile Tester. The sample to be tested is then attached to the jaws of the Tensile Tester and the jaws started to separate. The load in pounds is observed every 15 seconds over a 5 minute period or until the sample is completely torn in half. During the test the load rises to a relatively constant plateau and then falls off. The five highest load readings are averaged to obtain the load. The tear strength is then calculated and reported hereafter as pounds per inch corrected to a foam rubber density of 0.1 gm./c.c. by multiplying the load in pounds by 0.1 gm./c.c. and dividing by the product of the thickness of the sample multiplied by the density of the sample in gms./c.c.

Compression Modulus as reported herein is obtained by dividing compression load in pounds per square inch divided by deflection in percent and multiplied by 100. For compression purposes the Compression Modulus values herein reported have been corrected to equal density.

The resilience data set forth herein as Compression-Decompression for example at a deflection of 50% is obtained in each instance by compressing a foam rubber sample to a deflection of 25%, waiting 2 minutes; further compressing the sample to a deflection of 50%, waiting 2 minutes and recording the compression load; further compressing the sample to a deflection of 70% and waiting 2 minutes; and decompressing the sample to a deflection of 50%, waiting 2 minutes and recording the compression load. The hereafter reported resilience values are calculated and reported as per cent by dividing the second observed compression load at 50% deflection in pounds per square inch by the first observed compression load in pounds per square inch and multiplying by 100.

Compression Set as referred to herein is obtained by the conventional R.M.A. compression set test procedure for foam rubbers.

The physical test data for the foam rubber of this example in accordance with the invention is reported hereafter in Table I. For the purpose of comparison, physical tests data are also included for typical 100 percent Hevea latex foam rubber and 100% GR-S 2105 latex foam rubber.

TABLE I

|  | Hot wet tensile, lb./4 in.² | Tear strength, lb./in. | Compression modulus, p.s.i. at— | | Resilience, percent at 50% deflection | Compression set, percent |
|---|---|---|---|---|---|---|
|  |  |  | 25% deflection | 50% deflection |  |  |
| Foam rubbers in accordance with the invention | 20.5 | 5.9 | 2.4 | 2.65 | 65.7 | 7 |
| Typical Hevea foam rubbers | 10–14 | 3.5–4.0 | 2.2–2.5 | 2.2–2.5 | 82.0 | 3 |
| GR-S 2105 foam rubber | 6.3 | 2.0 | 1.25 | 1.65 | 77.5 | 4.5 |

Referring to the data set forth above it is seen that strengthwise the foam rubber in accordance with the invention was outstandingly superior not only to a typical previously used all synthetic latex foam rubber but also to Hevea latex foam rubber itself. This is of particular significance in view of the great difficulty previously experienced in the factory handling of foam rubbers.

EXAMPLE 2

A polystyrene resin latex was produced by polymerizing at 70° C. the following recipe to complete conversion:

|  | Parts by weight |
|---|---|
| Styrene | 100.0 |
| Potassium persulfate | 0.6 |
| Potassium oleate (as 20% solution) | 4.5 |
| Potassium rosin soap (as 20% solution) | 5.5 |
| A tertiary alkyl mercaptan modifier | 0.036 |
| Water | 250.00 |

The resulting latex had an average particle size of about 400 A and a total solids content of 33.4%. An amount of this latex containing 10 parts by weight of polystyrene was mixed with 1 part fatty acid soap and GR-S 1500 latex containing 100 parts by weight of GR-S 1500 rubber.

Additional portions of GR-S 1500 latex were each mixed with 1.0 part by weight of a fatty acid soap and varying amounts of the terpolymer latex described in Example 1 to provide mixtures containing respectively 5, 7.5 and 15 parts by weight of terpolymer per 100 parts by weight of GR-S 1500 rubber. All of these latices were agglomerated by freezing at 14° F. to produce agglomerated latices having average particle diameters in excess of 1,000 A. The agglomerated latices were all concentrated by evaporation to total solids contents of about 61%. Foam rubber samples were then produced from all of these concentrated latices employing the procedure and general compounding technique and formula outlined in Example 1.

Physical properties of the resulting foam rubbers were determined and are reported in the following Table II.

TABLE II

|  | Hot wet tensile, lb./4 in.² | Tear resistance, lb./in. | Compression modulus, p.s.i. at— | | Resilience, percent at 50% deflection | Compression set, percent |
|---|---|---|---|---|---|---|
|  |  |  | 25% deflection | 50% deflection |  |  |
| 5 parts terpolymer | 16.0 | 2.2 | 2.1 | 2.05 | 67.5 | 5.18 |
| 7.5 parts terpolymer | 20.6 | 3.7 | 2.35 | 2.35 | 70.5 | 5.46 |
| 15 parts terpolymer | 30.0 |  | 2.55 | 2.45 | 65.0 |  |
| 10 parts polystyrene | 25.0 | 4.3 "resistance," | 3.00 | 3.15 | 62.0 | 10 |

Referring to the above data it is seen again that the strength of reinforced synthetic latex foam rubbers in accordance with the invention are outstandingly excellent. Increasing the resin content according to the process of the invention increases strength of the foam rubber. The other properties are well within the tolerances of commercial foam rubbers.

EXAMPLE 3

A mixed latex was produced by admixing 1 part by weight potassium oleate, GR-S 1500 latex containing 100 parts by weight rubber and polystyrene resin latex produced by the same procedure employed in producing the polystyrene latex of Example 2, the polystyrene content of the resin latex being 10 parts by weight. The latex mixture was agglomerated to an average particle diameter in excess of 1,000 A and concentrated to 62% total solids according to the same procedure utilized in the preceding examples. A foam rubber compound was made according to the same formulation employed in the preceding examples except that the compound contained additionally 1.0 part by weight of potassium oleate. Portions of the resulting latex compound were additionally compounded by dusting therein with stirring varying amounts of dry coarse ground marble (Gamaco T). The latex compounds containing the ground marble were then made into foam rubbers according to the same procedures used in the preceding examples. Physical properties of the foam rubbers were determined and are set forth in Table III as follows:

TABLE III

| Parts by Weight CaCO₃ per 100 parts by weight rubber | Hot wet tensile, lb./4 in.² | Tear strength, lb./in.² | Compression modulus, p.s.i. at 25% deflection | Resilience, percent at 50% deflection | Compression* set, percent after additional heating at 212° F. prior to testing, hrs. | | |
|---|---|---|---|---|---|---|---|
|  |  |  |  |  | 1 | 3 | 4 |
| 0 | 26.0 | 3.90 | 2.40 | 59.4 | 13.8 | 9.4 |  |
| 30 | 18.0 | 2.95 | 2.14 | 68.6 | 8.2 | 5.5 | 5.5 |
| 40 | 15.4 | 2.65 | 2.20 | 64.9 | 6.8 | 7.1 | 5.5 |
| 50 | 13.0 | 2.30 | 1.96 | 62.1 | 8.2 | 9.0 | 7.6 |
| 60 | 12.5 | 2.25 | 1.82 | 59.1 | 8.2 | 7.6 | 8.4 |
| 70 | 9.6 | 1.80 | 1.84 | 59.0 | 7.7 | 6.1 | 10.0 |
| 80 | 8.8 | 1.45 | 1.62 | 61.9 | 10.6 | 6.2 | 6.7 |
| 90 | 8.0 | 1.30 | 1.85 | 58.1 | 8.4 | 8.3 | 7.2 |
| 100 | 7.0 | 1.25 | 1.70 | 56.3 | 10.0 | 8.6 | 8.4 |

*Samples in this instance were all heated at 158° F. for 22 hours prior to the additional heating and testing hereunder.

Referring to the above data it is seen that up to 60 to 70 parts loading did not affect the strength of foam rubbers in accordance with the invention sufficiently adversely to make these foam rubbers appreciably less strong than a good all Hevea rubber foam. As a matter of fact even 100 parts of loading did not render the resulting foam rubbers non-commercial. It is quite surprising that not only does loading of the special foam rubbers in accordance with the invention not adversely affect the properties of resilience and compression set but such loading in fact actually improves these properties.

EXAMPLE 4

As a further illustration of the practice of the invention a polybutadiene latex was prepared in a standard GR-S 1500 formulation and polymerization procedure except for the employment of all butadiene monomer instead of the combination of butadiene and styrene employed in producing GR-S 1500. The resulting polybutadiene latex had a total solids content of 22.7 percent, and an average particle diameter of approximately 600 A. The Mooney value of the polybutadiene was 61. A polystyrene latex such as employed in preceding examples was admixed along with one part of fatty acid soap in an amount to contain 10 parts polystyrene resin per 100 parts by weight of polybutadiene. The latex mixture was agglomerated by freezing and concentrated by evaporation to a solids content of 62 percent according to the procedure used in preceding examples. Foam rubber was produced from the concentrated latex using the same general formulation and procedure of the preceding examples. The resulting foam rubber had a Hot Wet Tensile of 14.3 lbs./4 in.$^2$, a Compression Modulus at a deflection of 25 % of 3.08 psi., and a Resilience (as compression-decompression at 50% deflection) of 59.8 percent. Here again an excellent strong, resilient foam rubber was produced in accordance with the invention.

EXAMPLE 5

As an illustration of other means operative in the practice of the invention to increase the average particle size of the disperse phase of a mixture of a latex of a synthetic butadiene rubber and an aqueous dispersion of a rubber reinforcing substance a GR-S 1500 latex containing 100 parts by weight of rubber was admixed with polystyrene latex containing 10 parts by weight polystyrene and produced according to the procedure and recipe employed in the preceding examples. To this mixture was added sufficient concentrated ammonium hydroxide to raise the pH from 9.5 to 10.2. While maintaining the mixture at room temperature carbon dioxide gas was bubbled through the latex mixture until the pH had reached a value of 7.0. One part by weight of a fractionated tall oil fatty acid soap (Neo-Fat S-142) was then added and the mixture was allowed to stand overnight to complete the process of increasing the average particle size of the mixture to in excess of 1,000 A. The pH of the mixture was adjusted to a value of 8.37 by the addition of 0.2 part by weight of potassium hydroxide (as a 10% solution) and the latex mixture was concentrated by evaporation to a total solids content of 62 percent.

The concentrated latex was compounded into a foamable compound according to the following recipe:

|  | Parts by Weight as dry solids |
|---|---|
| Coagglomerated concentrated latex | 100.0 |
| Neo-Fat S-142 | 1.5 |
| Potassium hydroxide | 0.1 |
| Sulfur | 2.0 |
| Zinc mercaptobenzothiazole | 1.0 |
| Zinc diethyl dithiocarbamate | 1.0 |
| Trimene base | 1.0 |
| Antioxidant | 1.0 |

To one portion of the above compound was added 0.7 part by weight additional Neo-Fat S-142 and 30 parts by weight Gamaco T, both per 100 parts by weight dry rubber of the latex. The two resulting compounds were whipped to desired foam density and the following dispersion was introduced into each of the foams with stirring.

|  | Parts by Weight as dry solids |
|---|---|
| Diphenyl guanidine (as 25% dispersion) | 1.5 |
| Zinc oxide (as 40% dispersion) | 3.0 |
| Sodium silico fluoride (as 50% dispersion) | 5.0 |

The foam mixtures were then introduced into suitable molds, allowed to gel and vulcanized. The foam rubber containing no calcium carbonate had a Hot Wet Tensile of 18.8 lbs./ 4 in.$^2$ and the foam rubber loaded with 30 parts by weight of calcium carbonate had a Hot Wet Tensile of 16.4 lbs./4 in.$^2$ Both of these foam rubbers, in accordance with the invention, displayed the excellence in properties obtained by the practice of the invention.

EXAMPLE 6

A GR-S 1500 latex and a polystyrene latex such as employed in preceding examples were mixed in proportions as to contain 100 parts rubber and 10 parts resin were mixed, coagglomerated by freezing and concentrated by evaporation to a total solids of 62 percent as in preceding examples. The concentrated latex was then compounded as follows:

|  | Parts by Weight as dry solids |
|---|---|
| Coagglomerated concentrated latex | 56.00 |
| GR-S 2105 | 50.00 |
| Ammonium oleate | 0.75 |
| Aquarex M.E.* | 0.25 |

*Sodium salts of sulfate of mono-ester of a mixture of higher fatty alcohols consisting chiefly of lauryl and myristyl derivatives.

The temperature of this mixture was reduced to 35° F. and while maintaining the temperature at this level the following additional ingredients were added as 50% aqueous dispersions:

|  | Parts by Weight as dry solids |
|---|---|
| Sulfur | 2.25 |
| Zinc mercaptobenzothiazole | 1.00 |
| Zinc diethyl dithiocarbamate | 2.25 |
| Antioxidant | 1.50 |
| Gamaco T | 30.00 |

To the above cool mixture was added 4 parts by weight of zinc oxide and the titratable $NH_3$ content was adjusted to between about 0.23 and 0.28 percent by the addition of ammonium hydroxide. To the mixture were added 10 percent yeast solution and 35 percent hydrogen peroxide solution in sufficient quantities to foam the mixture. The final mixture was introduced into a mold. The compound was allowed to expand in the mold by the action of the hydrogen peroxide and yeast; the resulting foam was frozen at about −30° F.; gaseous $CO_2$ was introduced into the mold the coagulate the foam; and the foam was then cured by heating to 230° F. The resulting foam rubber was of good commercial quality.

GR-S 2105 is a standard high solids rubber latex produced according to the following specification:

Specification for GR-S 2105

| Ingredient Charge formula | Parts/100 parts monomers |
|---|---|
| Butadiene | 70.0 |
| Styrene | 30.0 |
| Water | 60.0 |
| Potassium oleate | 1.25 |
| Tamol N | 1.5 |
| Diisopropylbenzene hydroperoxide | 0.22 |
| Ferrous sulfate heptahydrate | 0.10 |
| Potassium pyrophosphate | 0.25 |
| Sodium sulfhydrate | 0.05 |
| Potassium chloride | 0.8 |
| Tertiary alkyl mercaptan modifier | as required |

The following incremental charges are injected into the reactor at the indicated polymerization conversions:

|  | Parts/100 parts monomers |
|---|---|
| 1st increment at 20% conversion: |  |
| Sodium sulfhydrate | 0.02 |
| Diisopropylbenzene hydroperoxide | 0.08 |
| Water | 2.60 |
| 2nd increment at 30% conversion: |  |
| Ferrous sulfate heptahydrate | 0.03 |
| Potassium pyrophosphate | 0.05 |

| | |
|---|---|
| Diisopropylbenzene hydroperoxide | 0.08 |
| Water | 2.80 |
| 3rd and 4th increment at 45% and 60% conversion: | |
| Potassium oleate | 0.875 |
| Water | 4.000 |

Polymerization of the above materials is carried out at 50° F. The Sulfole employed is sufficient to give a Mooney viscosity (ML-4 at 212° F.) of approximately 100. At approximately 60 percent polymerization conversion the polymerization is stopped by a suitable shortstop agent, e.g., sodium dimethyl dithiocarbamate. The reaction mixture is stripped of unreacted monomer and the resulting latex has a solids content of from 47 to 50 percent and a pH of about 9.5 to 10.5.

Although the foam or other rubber articles produced from the novel latex of the invention is usually conventionally vulcanized by heating in the presence of elemental sulfur preferably also in the presence of one or more known accelerator (which may include an accelerator-activator), the gelled foam can be vulcanized by any technique known to the rubber art. Instead of free sulfur an NES curing agent of the sulfur-donor type (e.g. a thiuram disulfide, an alkylphenol-polysulfide, an amine polysulfide) can be utilized. The foam can be vulcanized or cross-linked by exposure to radiation, such as X-rays, alpha rays, beta rays, gamma rays and high energy electron beams. The more conventionally compounded foam can be heated for vulcanization by means of steam, hot water, hot air, or by electronic heating.

Reverting to the reinforcing dispersion, it is significant that soft resins or polymers such as polyethylacrylate are not appreciably effective in reinforcing the rubber of the latex, a harder resin such as polymethylmethacrylate or polystyrene being required to provide rigid particles in a operative dispersion insofar as organic resins are concerned. Also, a resin solution such as a reactive phenol-aldehyde resin solution or dispersion fails to provide the particulate colloidal dispersion necessary for effective reinforcement of the synthetic butadiene rubber latex, although a colloidal dispersion of inert phenol-aldehyde resin can be utilized. The organic resins suitable as reinforcing substances in the reinforcing dispersions should preferably be sufficiently rigid to exhibit a hardness value greater than one on the Rockwell M hardness scale. Polyhexamethylene adipamide, polycaprolactam, linear polypropylene and the high modulus linear polyethylene are examples of resins with hardness ratings between 1 and 100. Polystyrene at room temperature exhibits a hardness of about 100 on this scale.

An additional observation regarding differences in the Mooney values of synthetic rubbers utilized in the invention brings out a further variation of the invention of commercial significance. A GR-S 2105 type of latex was made to a Mooney ML-4 value of 50 and then was reinforced by admixture with a minor proportion of polystyrene latex as disclosed in the examples to produce a high solids reinforced butadiene synthetic rubber latex. A substantial proportion of conventional 150 Mooney ML-4 GR-S 2105 latex was admixed with the reinforced latex, and a latex foam article was produced in the usual manner. Surprisingly, it was found that the strength of the foam was higher than the average for control foams (1) based on the reinforced low Mooney latex and (2) based upon the high Mooney GR-S 2105 latex. Furthermore, the blended latex processed (produced foam with low shrinkage) better in the foam process than did the unblended reinforced low Mooney latex.

Further benefit in certain instances is realized in accordance with the invention when a phosphate is added to the reinforced latex. Additional improvement in both general processing as well as in final properties of the foam rubber is achieved. Effective phosphates for these purposes are the primary and secondary alkali metal and ammonium phosphates, the alkali metal and ammonium pyrophosphates and the various polyphosphates (represented by the proprietary Calgon).

When employed, these phosphates are used in the range of about 0.1 to 1.0 part by weight per 100 parts by weight rubber in the reinforced latex.

Vulcanized films and other products made from the reinforced synthetic butadiene rubber latex of the invention not only exhibit excellent physical properties comparable to the properties of natural rubber latex products, but also they are more resistant to aging than natural rubber products, exhibiting an improved resistance towards oxygen of the air, ozone and oxides of nitrogen. The novel products are also more resistant than the natural rubber products towards the deteriorating action of sunlight and other radiation, as well as towards heat.

What is claimed is:

1. Method of making synthetic latex particularly adapted for producing foam rubber comprising:
    A. Mixing
        1. a latex of a synthetic butadiene rubber having an average particle size in the range of 200 to about 1,500 angstroms, with
        2. a fluid aqueous colloidal dispersion of rigid particles of a rubber reinforcing substance having an average particle size of no more than about 2,000 angstroms to provide a latex mixture, the disperse phase of said latex mixture being composed of discrete particles of synthetic rubber and discrete particles of reinforcing substance, and
    B. increasing the average particle size of said latex mixture to above 1,000 angstroms by an agglomerating treatment whereby said disperse phase of said latex mixture is composed predominently of composite spherical particles containing both synthetic rubber and rubber reinforcing substance.

2. Method according to claim 1 wherein said latex of synthetic butadiene rubber has an average particle size in the range of 300 to 1,000 angstroms, said colloidal dispersion of rubber reinforcing substance has an average particle size in the range of about 100 to about 800 angstroms, and the average particle size of the disperse phase of said latex mixture after said agglomerating treatment is in excess of 1,500 angstroms.

3. Method according to claim 1 wherein said butadiene rubber is a butadiene-styrene copolymer.

4. Method according to claim 1 wherein said butadiene rubber is polybutadiene.

5. Method according to claim 1 wherein said rubber reinforcing substance is a rigid organic resin having a hardness value measured on the Rockwell M scale in excess of 1.

6. Method according to claim 1 wherein said rubber reinforcing substance is a styrene polymer.

7. Method according to claim 1 wherein said rubber reinforcing substance is a polystyrene.

8. Method according to claim 1 wherein said agglomerating treatment involves freezing of said latex mixture.

9. Method according to claim 1 wherein the average particle size of said latex mixture is increased by chemical means.

10. Method according to claim 1 wherein the agglomerated latex is concentrated to increase the solids content thereof.

11. A reinforced synthetic latex having an average particle size in excess of about 1,000 angstroms, the disperse phase of said latex being predominently composed of spherical composite particles containing a synthetic butadiene rubber and a rubber reinforcing substance.

12. A reinforced synthetic latex according to claim 8 wherein the amount of synthetic butadiene rubber in said composite particles is 100 parts by weight and the amount of said rubber reinforcing substance in said composite particles is in the range of about 1 to about 30 parts by weight.

13. Method of making synthetic latex foam rubber comprising:
    A. Mixing
        1. a latex of a synthetic butadiene rubber having an average particle size in the range of 200 to about 1,500 angstroms with 2. a fluid aqueous colloidal dispersion of rigid particles of a rubber reinforcing substance having an average particle size of no more than about 2,000 angstroms to provide a latex mixture, the disperse phase of said latex mixture being composed of discrete particles of synthetic rubber and discrete particles of reinforcing substance, B. increasing the average particle size of said latex to above 1,000 angstroms by an agglomerating treatment whereby said disperse phase of said latex mixture is composed predominently of composite spherical particles containing both synthetic rubber and rubber reinforcing substance, C. incorporating into the agglomerated latex vulcanizing ingredients, D. frothing said agglomerated latex, E. gelling the frothed latex, and F. vulcanizing the gelled latex.

14. Method according to claim 13 wherein a pigment filler is incorporated into said agglomerated latex prior to frothing the same.

15. Method according to claim 13 wherein calcium carbonate is incorporated into said agglomerated latex prior to frothing the same.

16. A reinforced synthetic butadiene rubber latex foam rubber produced by the method of claim 13.

17. Method according to claim 13 wherein a phosphate selected from the group consisting of primary and secondary alkali metal and ammonium phosphates, the alkali metal and ammonium pyrophosphates and polyphosphates is incorporated into said agglomerated latex prior to frothing the same.

18. Method according to claim 1 wherein said latex of synthetic butadiene rubber has an average particle size in the range of 300 to 1,000 angstroms, said colloidal dispersion of rubber reinforcing substance has an average particle size in the range of about 100 to about 2,000 angstroms, and the average particle size of the disperse phase of said latex mixture after said agglomerating treatment is in excess of 1,500 angstroms.

19. A latex containing dispersed individual particles which comprise agglomerated butadiene hydrocarbon polymer having entrapped therein individual particles of inorganic reinforcing pigment which agglomerated particles are formed by the coalescence of dispersed butadiene hydrocarbon polymer particles and the entrapment of individual particles of reinforcing pigment by the coalescing butadiene hydrocarbon polymer particles as they coalesce to form new larger dispersed butadiene hydrocarbon polymer particles.

20. A latex containing dispersed individual particles which comprise agglomerated butadiene-styrene copolymer having entrapped therein individual particles of inorganic reinforcing pigment which agglomerated particles are formed by the coalescence of dispersed butadiene hydrocarbon polymer particles and the entrapment of individual particles of reinforcing pigment by the coalescing butadiene hydrocarbon polymer particles as they coalesce to form new larger dispersed butadiene hydrocarbon polymer particles, said particles of inorganic reinforcing pigment having an average particle size of less than 2,000 A.

21. A latex containing dispersed individual particles which comprise agglomerated butadiene-styrene-copolymer having entrapped therein individual particles of inorganic reinforcing pigment which agglomerated particles are formed by the coalescence of dispersed particles of said butadiene-styrene copolymer and the entrapment of individual particles of reinforcing pigment by the coalescing butadiene-styrene copolymer particles as they coalesce to form new larger dispersed butadiene-styrene copolymer particles, said butadiene-styrene copolymer containing at least 51 percent by weight of a bound butadiene-1,3 hydrocarbon.

22. A method for internally reinforcing butadiene hydrocarbon polymer particles of an emulsion-polymerized butadiene hydrocarbon polymer synthetic latex in which the surfaces of the polymer particles are incompletely covered with emulsifier and the polymer constituent of which contains at least 51 percent by weight of a bound butadiene-1,3 hydrocarbon which comprises adding an aqueous dispersion of an inorganic reinforcing pigment to the said butadiene hydrocarbon polymer latex, freezing said latex with said inorganic reinforcing pigment dispersion therein to a solid mass at a temperature above temperatures at which the latex coagulates, and reconstituting a fluid latex from the frozen mass of latex by completely thawing the frozen mass.

23. A method for internally reinforcing butadiene hydrocarbon polymer particles of an emulsion-polymerized butadiene hydrocarbon polymer synthetic latex in which the surfaces of the polymer particles are incompletely covered with emulsifier and the polymer constituent of which contains at least 51 percent by weight of a bound butadiene-1,3 hydrocarbon which comprises adding an aqueous dispersion of an inorganic reinforcing pigment to the said butadiene hydrocarbon polymer latex, reducing the pH of the said latex to a pH value above pH values sufficient to cause coagulation of the said latex, freezing said latex with said inorganic reinforcing pigment dispersion therein to a solid mass at a temperature above temperatures at which the latex coagulates, and reconstituting a fluid latex from the frozen mass of latex by completely thawing the frozen mass.

24. A method for internally reinforcing butadiene hydrocarbon particles of an emulsion-polymerized butadiene hydrocarbon polymer synthetic latex in which the surfaces of the polymer particles are incompletely covered with emulsifier and the polymer constituent of which contains at least 51 percent by weight of a bound butadiene-1,3 hydrocarbon which comprises adding an aqueous dispersion of an inorganic reinforcing pigment having an average particle size of less than 2,000 A. to the said butadiene hydrocarbon polymer latex, freezing said latex with said inorganic reinforcing pigment dispersion therein to a solid mass at a temperature above temperatures at which the latex coagulates, and reconstituting a fluid latex from the frozen mass of latex by completely thawing the frozen mass.

25. A method for internally reinforcing butadiene-styrene copolymer particles of an emulsion-polymerized butadiene-styrene copolymer synthetic latex in which the surfaces of the polymer particles are incompletely covered with emulsifier and the butadiene-styrene copolymer constituent of which contains at least 51 percent by weight of a bound butadiene-1,3 hydrocarbon which comprises adding an aqueous dispersion of an inorganic reinforcing pigment to the said butadiene-styrene copolymer latex, freezing said latex with said inorganic reinforcing pigment dispersion therein to a solid mass at a temperature above temperatures at which the latex coagulates, and reconstituting a fluid latex from the frozen mass of latex by completely thawing the frozen mass.

26. A method for internally reinforcing butadiene-styrene copolymer particles of an emulsion-polymerized butadiene-styrene copolymer synthetic latex in which the surfaces of the polymer particles are incompletely covered with an emulsifier and the butadiene-styrene copolymer constituent of which contains at least 51 percent by weight of a bound butadiene-1,3 hydrocarbon which comprises adding an aqueous dispersion of an inorganic reinforcing pigment to the said butadiene-styrene copolymer latex, reducing the pH of the said latex to a pH value above pH values sufficient to cause coagulation of the said latex, freezing said latex with said inorganic reinforcing pigment dispersion therein to a solid mass at a temperature above temperatures at which the latex coagulates, and reconstituting a fluid latex from the frozen mass of latex by completely thawing the frozen mass.

27. A method for internally reinforcing butadiene-styrene copolymer particles of an emulsion-polymerized butadiene-styrene copolymer synthetic latex in which the surfaces of the polymer particles are incompletely covered with an emulsifier and the butadiene-styrene copolymer constituent of which contains at least 51 percent by weight of a bound butadiene- 1,3 hydrocarbon which comprises adding an aqueous dispersion of an inorganic reinforcing pigment having an average particle size of less than 2,000 A. to the said butadiene-styrene copolymer latex, freezing said latex with said inorganic reinforcing pigment dispersion therein to a solid mass at a temperature above temperatures at which the latex coagulates, and reconstituting a fluid latex from the frozen mass of latex by completely thawing the frozen mass.

28. A method for internally reinforcing butadiene hydrocarbon polymer particles of an emulsion-polymerized butadiene hydrocarbon polymer synthetic latex in which the polymer constituent contains at least 51 percent by weight of a bound butadiene-1,3 hydrocarbon which comprises mixing an aqueous dispersion of a resinous polymer selected from the group consisting of resinous homopolymers having a refractive index at 20° C. for the sodium D line of less than 1.5900 as determined by A.S.T.M. Procedure No. D-542 and having a second order transition temperature above room temperature and resinous interpolymers having a second order transition temperature above room temperature with the said butadiene hydrocarbon polymer latex, the emulsifier present in the resulting mixture of butadiene hydrocarbon polymer latex and resinous polymer dispersion being insufficient to completely cover the surface area of the polymer particles of the mixture, freezing said mixture of butadiene hydrocarbon polymer latex and resinous polymer dispersion to a solid mass at a temperature above temperatures at which the said mixture coagulates, and reconstituting a fluid latex from the frozen mass by completely thawing the frozen mass.

29. A method for internally reinforcing butadiene hydrocarbon polymer particles of an emulsion-polymerized butadiene hydrocarbon polymer synthetic latex in which the polymer constituent contains at least 51 percent by weight of a bound butadiene-1,3 hydrocarbon which comprises mixing an aqueous dispersion of a resinous polymer selected from the group consisting of resinous homopolymers having a refractive index at 20° C. of less than 1.5900 as determined by A.S.T.M. Procedure No. D-542 and having a second order transition temperature above room temperature and resinous interpolymers having a second order transition temperature above room temperature with the said butadiene hydrocarbon polymer latex, the emulsifier present in the resulting mixture of butadiene hydrocarbon polymer latex and resinous polymer dispersion being insufficient to completely cover the surface area of the polymer particles of the mixture, reducing the pH of the said mixture to a pH value above pH values sufficient to cause coagulation of the said mixture, freezing said mixture of butadiene hydrocarbon polymer latex and resinous polymer dispersion to a solid mass at a temperature above temperatures at which the said mixture coagulates, and reconstituting a fluid latex from the frozen mass by completely thawing the frozen mass.

30. A method for internally reinforcing butadiene hydrocarbon polymer particles of an emulsion-polymerized butadiene hydrocarbon polymer synthetic latex in which the polymer constituent contains at least 51% by weight of a bound butadiene-1,3 hydrocarbon which comprises mixing an aqueous dispersion of a resinous polymer having an average particle size of less than 2,000 A. with said emulsion-polymerized butadiene hydrocarbon polymer synthetic latex, said resinous polymer being selected from the group consisting of resinous homopolymers having a refractive index at 20° C. for the sodium D line of less than 1.5900 as determined by A.S.T.M. Procedure No. D-542 and having a second order transition temperature above room temperature and resinous interpolymers having a second order transition temperature above room temperature, the emulsifier present in the resulting mixture of butadiene hydrocarbon polymer latex and resinous polymer dispersion being insufficient to completely cover the surface area of the polymer particles of the mixture, freezing said mixture of butadiene hydrocarbon polymer latex and resinous polymer dispersion to a solid mass at a temperature above temperatures at which the said mixture coagulates, and reconstituting a fluid latex from the frozen mass by completely thawing the frozen mass.

31. A method for internally reinforcing butadiene hydrocarbon polymer particles of an emulsion-polymerized butadiene hydrocarbon polymer synthetic latex in which the polymer constituent contains at least 51 percent by weight of a bound butadiene-1,3 hydrocarbon which comprises mixing an aqueous dispersion of a resinous homopolymer having a refractive index at 20° C. for the sodium D line of less than 1.5900 as determined by A.S.T.M. Procedure No. D-542 and having a second order transition temperature above room temperature with the said butadiene hydrocarbon polymer latex, the emulsifier present in the resulting mixture of butadiene hydrocarbon polymer latex and resinous polymer dispersion being insufficient to completley cover the surface area of the polymer particles of the mixture, freezing said mixture of butadiene hydrocarbon polymer latex and resinous polymer dispersion to a solid mass at a temperature above temperatures at which the said mixture coagulates, and reconstituting a fluid latex from the frozen mass by completely thawing the frozen mass.

32. A method for internally reinforcing butadiene hydrocarbon polymer particles of an emulsion-polymerized butadiene hydrocarbon polymer synthetic latex in which the polymer constituent contains at least 51 percent by weight of a bound butadiene-1,3 hydrocarbon which comprises mixing an aqueous dispersion of a resinous interpolymer having a second order transition temperature above room temperature with the said butadiene hydrocarbon polymer latex, the emulsifier present in the resulting mixture of butadiene hydrocarbon polymer latex and resinous polymer dispersion being insufficient to completely cover the surface area of the polymer particles of the mixture, freezing said mixture of butadiene hydrocarbon polymer latex and resinous polymer dispersion to a solid mass at a temperature above temperatures at which the said mixture coagulates, and reconstituting a fluid latex from the frozen mass by completely thawing the frozen mass.

33. A latex containing dispersed individual particles which comprise agglomerated butadiene hydrocarbon polymer having entrapped therein individual particles of resinous polymer selected from the group consisting of (1) resinous homopolymers having a refractive index at 20° C. for the sodium D line of less than 1.5900 as determined by A.S.T.M. Procedure No. D-542 and having a second order transition temperature above room temperature and (2) resinous interpolymers having a second order transition temperature above room temperature which agglomerated particles are formed by the coalescence of dispersed butadiene hydrocarbon polymer particles and the entrapment of individual particles of said resinous polymer by the coalescing butadiene hydrocarbon polymer particles as they coalesce to form new larger dispersed butadiene hydrocarbon polymer particles, said agglomerated butadiene hydrocarbon polymer containing at least 51 percent by weight of a bound butadiene-1,3 hydrocarbon.

34. A latex containing dispersed individual particles which comprise agglomerated butadiene hydrocarbon polymer having entrapped therein individual particles of resinous polymer selected from the group consisting of (1) resinous homopolymers having a refractive index at 20° C. for the sodium D line of less than 1.5900 as determined by A.S.T.M. Procedure No. D-542 and having a second order transition temperature above room temperature and (2) resinous interpolymers having a second order transition temperature above room temperature which agglomerated particles are formed by the coalescence of dispersed butadiene hydrocarbon polymer particles and the entrapment of individual particles of said resinous polymer by the coalescing butadiene hydrocarbon particles as they coalesce to form new larger dispersed butadiene hydrocarbon polymer particles, said agglomerated butadiene hydrocarbon polymer containing at least 51 percent by weight of a bound butadiene-1,3 hydrocarbon, said particles of resinous polymer having an average particle size of less than 2,000 A.

35. A latex containing dispersed individual particles which comprise agglomerated butadiene hydrocarbon polymer having entrapped therein individual particles of resinous homopolymer having a refractive index at 20° C. for the sodium D line of less than 1.5900 as determined by A.S.T.M. Procedure No. D-542 and having a second order transition temperature above room temperature which agglomerated particles are formed by the coalescence of dispersed butadiene hydrocarbon polymer particles and the entrapment of individual particles of said resinous homopolymer by the coalescing butadiene hydrocarbon particles as they coalesce to form new larger dispersed butadiene hydrocarbon polymer particles, said agglomerated butadiene hydrocarbon polymer containing at least 51 percent by weight of a bound butadiene-1,3 hydrocarbon.

36. A latex containing dispersed individual particles which comprise agglomerated butadiene hydrocarbon polymer having entrapped therein individual particles of resinous interpolymer having a second order transition temperature above room temperature which agglomerated particles are formed by the coalescence of dispersed butadiene hydrocarbon polymer particles and the entrapment of individual particles of said resinous interpolymer by the coalescing butadiene hydrocarbon particles as they coalesce to form new larger dispersed butadiene hydrocarbon polymer particles, said agglomerated butadiene hydrocarbon containing at least 51 percent by weight of a bound butadiene-1,3 hydrocarbon.

* * * * *

PO-1050
(5/69)

UNITED STATES PATENT OFFICE
CERTIFICATE OF CORRECTION

Patent No. 3,673,133      Dated June 27, 1972

Inventor(s) ERNST SCHMIDT

It is certified that error appears in the above-identified patent and that said Letters Patent are hereby corrected as shown below:

Column 2, Line 75 - "1500 A" should be --1500°A--.

Column 3, Line 2 - "800 A" should be --800°A--.

Column 3, Line 68 - "suitable" should be --suitably--.

Column 4, Line 6 - Insert "of" after "or".

Column 6, Line 29 - "best" should be --test--.

Column 10, Line 26 - Insert an asterisk before "Sodium".

Signed and sealed this 5th day of December 1972.

(SEAL)
Attest:

EDWARD M. FLETCHER, JR.
Attesting Officer

ROBERT GOTTSCHALK
Commissioner of Patents